Oct. 28, 1969    J. P. LOMBARDI    3,474,514
APPARATUS FOR MAKING SPIRAL SEAMED CORRUGATED
LAMINATED PIPE WITH UNCORRUGATED INTERIOR
Original Filed April 6, 1965    2 Sheets-Sheet 1
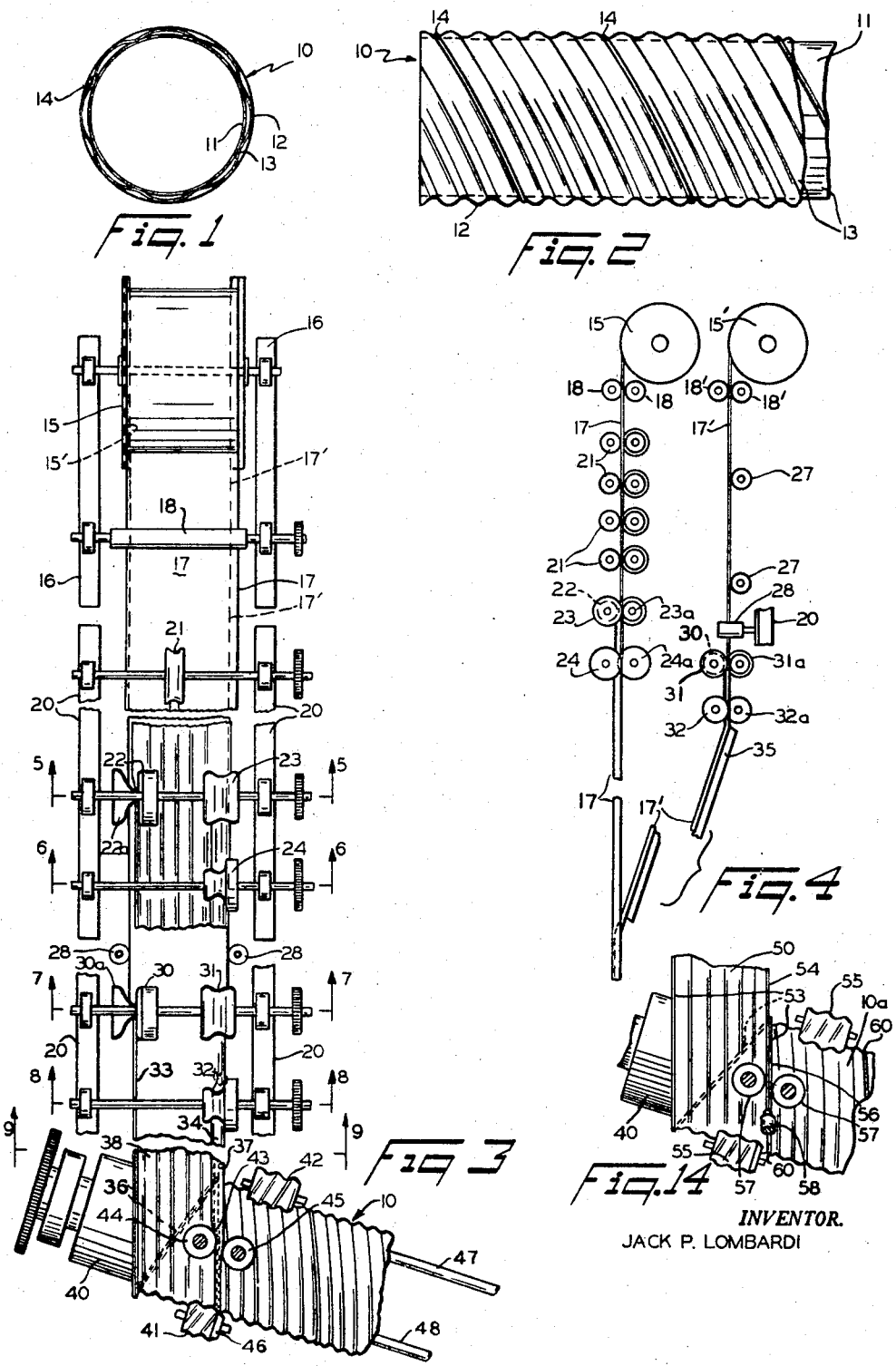
INVENTOR.
JACK P. LOMBARDI

*INVENTOR.*
JACK P. LOMBARDI

# United States Patent Office 3,474,514
Patented Oct. 28, 1969

3,474,514
APPARATUS FOR MAKING SPIRAL SEAMED CORRUGATED LAMINATED PIPE WITH UNCORRUGATED INTERIOR
Jack P. Lombardi, Duguid Road, Manlius, N.Y. 13104
Original application Apr. 6, 1965, Ser. No. 445,966, now Patent No. 3,340,901, dated Sept. 12, 1967. Divided and this application May 19, 1967, Ser. No. 639,903
Int. Cl. B21b 19/00; F16l 9/00
U.S. Cl. 29—200                           2 Claims

ABSTRACT OF THE DISCLOSURE

Apparatus for forming laminated corrugated pipe with an uncorrugated inner layer includes means for drawing strip material webs for inner and outer layers from separate reels, roller means for corrugating the outer layer web and flange forming means for forming locking flanges at each edge of each web. Means are also provided for guiding the inner and outer layer together to form a laminated web with the locking flanges interengaged and the laminated web is wound helically on a mandrel with the locking flange on one side of one turn of laminated web engaged with the locking flange on the other side of the adjacent turn. Means supported from outside the wound web are provided for securing together the engaged flanges of the turns and for forcing the formed pipe axially from the mandrel as it is wound.

CROSS REFERENCES TO RELATED APPLICATIONS

This application is a division of copending application Ser. No. 445,966 of the same inventor filed Apr. 6, 1965, now Patent No. 3,340,901, and is an improvement of the apparatus described in U.S. Patent 3,263,321 to Jack P. Lombardi, dated Aug. 2, 1966.

BACKGROUND OF THE INVENTION

This invention relates to a spiral seamed laminated pipe with corrugated outer layer and uncorrugated inner layer together with apparatus for fabricating the same.

Corrugated pipe is widely used for culverts and other drainage pipe because of its strength. Because of its corrugations, however, water does not drain entirely from the pipe, resulting in corrosion of the pipe.

Corrugated pipe with uncorrugated liner has heretofore been made by first fashioning the corrugated outer layer and subsequently securing therein an uncorrugated liner, usually in a trough-like configuration. Such pipe is unsatisfactory in that the trough-like interior must be at the bottom of the pipe when it is used and the pipe with uncorrugated liner secured to the corrugated exterior at spaced intervals has little more strength than the unlined exterior layer.

SUMMARY

The present invention contemplates, and apparatus is described herein for making, a spirally wound laminated pipe in which the corrugated outer layer and uncorrugated inner layer are secured together along a spiral seam in a unitary whole in which the inner layer extends completely around the interior of the pipe and the outer layer extends completely around the exterior of the pipe. Inner and outer layers are locked together and locked to one another along the helically extending seam to give strength to the resulting product.

The principal object of the invention, accordingly, is to provide a corrugated pipe having an uncorrugated inner wall so that drainage through the inside may be complete.

A further object is to provide a spirally wound laminated pipe with corrugated exterior and uncorrugated interior in which the interior lamination extends continuously around the interior of the pipe and the outer corrugated layer completely encloses the interior layer.

A still further object is to provide apparatus for fabricating a spirally wound laminated pipe having a spirally extending locking seam, and having a corrugated outer layer completely enclosing an uncorrugated inner layer which extends completely around the interior of the pipe.

Other objects and advantages will appear from the following description in conjunction with the appended drawings, in which:

BRIEF DESCRIPTION OF THE DRAWINGS

FIGURE 1 is an end view and FIGURE 2 is a fragmentary side elevational view of a section of pipe according to the invention;

FIGURE 3 is a diagrammatic fragmentary plan view of apparatus for the fabrication thereof;

FIGURE 4 is a diagrammatic fragmentary side elevational view of a portion of the apparatus of FIGURE 3;

FIGURE 14, on the first sheet of drawings, is a fragmentary plan view of the mandrel showing welding means for forming the spiral seam;

DESCRIPTION OF THE PREFERRED EMBODIMENTS

Figure 5:
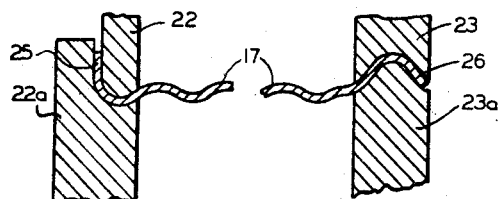
FIGURES 5 and 6 are enlarged diagrammatic fragmentary sectional views of the upper layer of the web on the lines 5—5 and 6—6, respectively, of FIGURE 3.

In FIGURES 1 and 2 are shown a laminated corrugated pipe 10 having an inner uncorrugated layer 11 and an outer corrugated layer 12. The pipe 10 is spirally wound, both inner and outer layers of the laminated sidewall 13 being joined, as will hereinafter appear, along a spirally extending seam 14, one edge of each turn of the laminated side wall web being locked to the web of the adjacent turn by the seam 14.

In FIGURES 3 and 4, apparatus is diagrammatically shown illustrating the method of fabrication of the pipe 10.

Two reels 15 and 15' are supported, one above the other, on suitable shafts journalled on the frame 16. Elongated strips 17 and 17' of sheet metal are drawn from the reels over suitable aligning rolls 18 and 18' and fed to forming rolls journalled on a mill frame 20 (FIG. 1) aligned with the reel frame 16.

Figure 6:
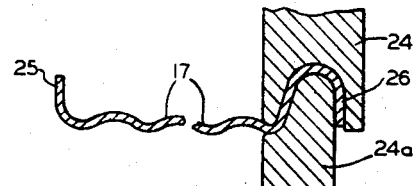

A series of corrugating rolls 21 are provided on frame 20 for the strip 17 and beyond the corrugating rolls, edge forming rolls 22 and 22a, 23 and 23a, and 24 and 24a are provided for forming locking flanges on the edges of the now corrugated strip 17. As best seen in FIGURES 5 and 6, the forming rolls 22 and 22a provide the strip 17 with an upturned male locking flange 25 at one edge of the strip in a manner more fully described in my copending application Ser. No. 351,352, filed Mar. 12, 1964. Edge forming rolls 23, 23a, 24 and 24a form a downwardly facing female locking flange 26 at the other edge of the strip 17 in a two-step operation.

As best seen in FIGURE 1, strip 17' below strip 17 is somewhat narrower to allow for the narrowing effect of the corrugating operation on strip 17 and, as seen in FIGURE 4, support rolls 27 journalled on frame 20 are provided for carrying strip 17' under the corrugating mill for strip 17.

Figure 7:
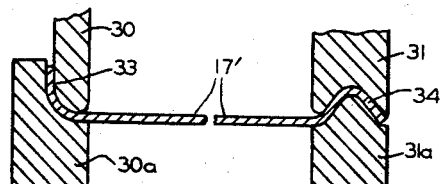
FIGURES 7 and 8 are enlarged diagrammatic fragmentary views of the lower layer of the web on the lines 7—7 and 8—8, respectively, of FIGURE 3.
Figure 8:
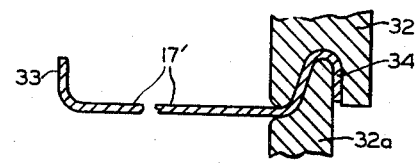

Alignment rollers 28 are provided for the strip 17' for precisely aligning the strip with respect to upper strip before it enters the edge forming rolls 30, 30a, 31, 31a, 32 and 32a which are supported on frame 20 for the lower strip. As best seen in FIGURES 7 and 8, the rolls 30 and 30a form an upwardly projecting male locking flange 33 on the edge of strip 17' underneath the flange 25 of the upper strip and rolls 31, 31a, 32 and 32a provide a downwardly facing female locking strip 34 at the opposite edge of the strip in a two-step operation.

Figure 9:
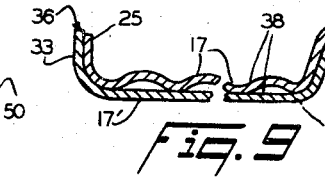
FIGURE 9 is an enlarged diagrammatic fragmentary sectional view of the web on the line 9—9 of FIGURE 3.

After passing through the edge forming rolls the lower strip 17' is guided upward toward the strip 17 by a chute 35 as indicated in FIGURE 4. As indicated in FIGURE 9, when the formed strip 17' meets the corrugated strip 17, the female flange 34 engages in the flange 26 of the upper strip to form a laminated female flange 37. The strip widths are so predetermined and the edge forming rolls so located that when the female flanges interlock, the male flanges 33 and 25 interengage at the other edge to form a laminated male locking flange 36 and the engaged strips 17 and 17' form a laminated web 38 whose upper layer is corrugated and lower layer is not.

Figure 10:
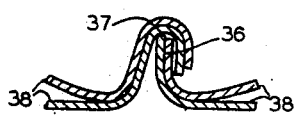
FIGURES 10, 11, 12 and 13 are enlarged diagrammatic fragmentary sectional views illustrating successive steps in forming the locking seam on the mandrel.

Just as described in my copending application hereinabove referred to, the laminated web 38 is then wound over a rotating mandrel 40 which is disposed at an angle to the path of travel of the web 38. As the web 38 makes one complete turn about mandrel 40, the flange 36 which projects outwardly of the mandrel enters the inwardly facing female flange 37 of the succeeding turn of the web continuously, as the web is turned on the mandrel in a manner illustrated diagrammatically in FIGURE 10.

Rollers 41 and 42 are supported, by means not shown, around the mandrel 40 and have a conformation matching that of the corrugated outer layer 17 of the web. Rollers 41 and 42, and another not seen in FIG. 3, are driven, by means not shown, so as to act like gears to drive the formed pipe 10 axially of mandrel 40 as it is formed.

Figure 11:
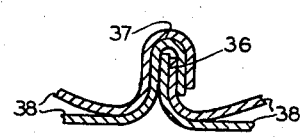

Web 38, as it is continuously drawn on to the mandrel 40, therefore, has, at 43, a point where flange 36 of one turn is continuously entering the inwardly facing flange 37 of the next turn, and immediately beyond this point a pair of rollers 44, 45, also supported, by means not shown, adjacent mandrel 40, pinch the sides of flanges 37 together against the interengaged flange 36, as shown diagrammatically in FIGURE 11.

Figure 12:
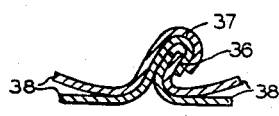
Figure 13:
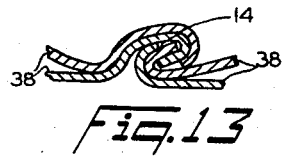

Roller 41 is provided with a tapered end 46 which knocks the now locked-together flanges 36 and 37 over toward one side as illustrated in FIGURE 12, and another roller such as roller 42 forces the locked-together flanges down against the web 38 to form the now double-locked seam 14.

The now formed pipe 10 is supported on axially extending rollers 47, 48 as it comes off the mandrel 40 and may be cut into any desired length by appropriate means such as a torch.

It will now be apparent that the corrugated outer layer 17 and the uncorrugated layer 17' are locked together at the lock seam joint 14 and each turn of the side wall web is locked to the adjacent turn forming a unitary and rigid pipe. While inner and outer layers are in contact only at the valleys of the corrugations, as shown in FIGURE 9, and at the seam 14, the pipe side wall is in two layers. The outer corrugated layer extends completely around the outside of the pipe, including the seam 14, and the uncorrugated inner layer likewise extends completely around the inside of the pipe. When installed in a culvert, for example, no pockets are formed by corrugations within the pipe and drainage may be complete.

It will also be apparent that either the outer corrugated layer or the inner layer may be formed as a double layer, by means described in my aforesaid copending application thereby providing a pipe with a third intermediate layer of sheet material, or the intermediate layer may be of material other than metal such as tar-paper. Alternatively, suitable plastic material may be applied between the inner and outer layer as the strip 17 rises on chute 35 to fill the spaces between layers formed by the hills of the corrugations in the outer layer.

Similar apparatus and method may be used to form a pipe 10a with a spiral welded seam as illustrated in FIGURE 14. Since welding the seam eliminates the necessity for interlocking hooks male locking flanges are provided at either side of the web.

Referring again to FIGURES 3 and 4, the edge forming rolls 23, 23a, 24 and 24a are replaced with a pair of male flange forming rolls similar to the rolls 22 and 22a for the upper strip 17. Rolls 31, 31a, 32 and 32a are replaced by a single pair of rolls similar to rolls 30 and 30a for the strip 17'.

Figure 15:
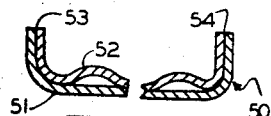
FIGURE 15 is a sectional view similar to FIGURE 9 showing a laminated web for use with welded seam.

When the chute 35 guides the lower strip into engagement with the upper strip a laminated web 50 is formed as shown in FIGURE 15 having an uncorrugated lower layer 51 and a corrugated upper layer 52. At either side of the web the male flanges project upward interlocking the web as shown and forming laminated flanges 53 and 54.

When the web 50 is wound around the mandrel 40, as shown in FIGURE 14, the laminated flanges 53 and 54 project radially of the mandrel. A plurality of rollers 55 guide the web 50 and force it against the mandrel. Rollers 55 are supported, by means not shown, independent of the mandrel, are corrugated to mesh with the outer layer of web 50, and are driven to force the pipe 10a axially of the mandrel as described above in connection with the fabrication of the pipe 10.

Figure 16:
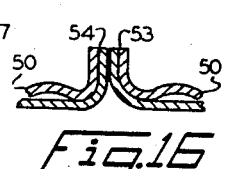
FIGURE 16 is a sectional view similar to FIGURE 10 showing the locking flanges of adjacent turns on the mandrel prior to welding the seam.

The angle at which mandrel 40 is disposed to the line of travel of web 50, as it comes from the forming mill, is such that the laminated flange 53, as web 50 is wrapped around the mandrel, comes up against the flange 54 of the succeeding turn of the web around the mandrel at a point denoted 56 in FIGURE 14. The laminated flange 54 of one turn abuts the laminated flange 53 of the preceding turn of the web in side-by-side manner as shown in FIGURE 16.

A pair of pinch rolls 57—57 force the abutting flanges 54 and 53 together immediately beyond the point 56 and an electrode 58, shown fragmentarily in FIGURE 14 is directed toward the pressed-together flanges 54 and 53 as they emerge from between rolls 57—57. Both the pair of rolls 57—57 and the electrode 58 are supported independently of the mandrel 40 and the electrode 58 may be a portion of an electron beam welding unit, or a shielded arc method of welding may be used.

After the welded flange 54–53 is beaded together by the welding means it is carried around the mandrel 40 and cools becoming the welded spiral seam 60 of the pipe 10a.

The welded pipe is continuously forced axially of the mandrel as described above and after it has left the mandrel the pipe is cut into suitable lengths.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. A machine for forming sheet metal into laminated pipe having a corrugated outer layer and an uncorrugated inner layer, the layers being secured together in a helically extending seam, comprising: means for simultaneously and continuously feeding forward to a forming mill more than one sheet metal strip in overlying parallel relation to one another, the forming mill having corrugating rolls and edge forming rolls for the upper strip and having edge forming rolls for the lower strip disposed in the mill below the rolls for the upper strip, said edge forming rolls being adapted for forming on each strip an upwardly projecting locking flange on each side thereof; means forward the edge forming rolls for continuously guiding one strip toward the other to form a laminated web with laminated flanges; a mandrel forward of the guiding means, the mandrel being disposed at an angle to the direction in which the web is fed and being supported and driven at one end for winding the web spirally on the mandrel; guide rollers independently supported around the mandrel for holding the web against the mandrel, the mandrel being disposed at such an angle to the web as to continuously engage the locking flange on one side of the web with the locking flange on the opposite side of the succeeding turn of the web about the mandrel; pinch roll means supported independently of the mandrel on either side of the engaged locking flanges for pressing the engaged flanges together; means forward of the pinch rolls for forming the engaged flanges into a spiral seam and thereby securing the pipe together; at least one of the rollers being driven independently of the mandrel for continuously forcing the formed pipe axially along the mandrel; and support rollers extending axially of the formed pipe for rotatably supporting the formed pipe and the end of the mandrel opposite the driven end as the formed pipe is continuously forced off the mandrel.

2. A machine for forming sheet metal into laminated pipe having a corrugated outer layer and an uncorrugated inner layer, the layers being secured together in a helically extending lock seam, comprising: means for simultaneously and continuously feeding forward to a forming mill more than one sheet metal strip in overlying parallel relation to one another, the forming mill having corrugating rolls and edge forming rolls for the upper strip and having edge forming rolls for the lower strip disposed in the mill below the rolls for the upper strip, said edge forming rolls being adapted for forming on each strip a male locking hook at one side of the strip and an open sided female locking hook at the other side of the strip, the male hook being a flange projecting normal to the strip in a direction opposite to the direction in which the open side of the female hook faces; means forward of the edge forming rolls for guiding one strip toward the other to form a laminated web with the male hooks projecting side-by-side at one edge of the web and the female hooks interfitted at the other edge of the web; a mandrel forward of the guiding means having a diameter equal to the desired inside diameter of the pipe, the mandrel being disposed at an angle to the direction in which the web is fed and being supported and driven at one end for winding the web spirally on the mandrel with the male hooks projecting radially of the mandrel; guide rollers independently supported around the mandrel for holding the web against the mandrel, the mandrel being disposed at such an angle to the web as to continuously engage the male hooks on the one edge of the web within the interfitted female hooks on the opposite edge of the succeeding turn of the web about the mandrel; pinch roll means supported independently of the mandrel on either side of the interengaged male and female hooks of the web for continuously squeezing the sides of the interfitted female hooks together against the male hooks to form a lock seam; the guide rollers being provided with means for bending the lock seam over and clinching it against the outer layer of the pipe formed on the mandrel, at least one of the guide rollers being corrugated to cooperate with the corrugated outer layer of the pipe and being driven to force the formed pipe axially along the mandrel; and support rollers extending axially of the formed pipe for rotatably supporting the formed pipe and the end of the mandrel opposite the driven end as the formed pipe is continually forced off the mandrel.

References Cited

UNITED STATES PATENTS 2,862,469 12/1958 Jensen _____ 72–49
3,263,321 8/1966 Lombardi _____ 228—17X THOMAS H. EAGER, Primary Examiner U.S. Cl. X.R.

29—429; 72—49; 138—173; 228—17